United States Patent
Nilsson et al.

(10) Patent No.: US 12,477,521 B1
(45) Date of Patent: Nov. 18, 2025

(54) USER EQUIPMENT (UE) BEAM REPORTS FOR UES WITH DIFFERENT KINDS OF UE PANELS

(71) Applicant: Telefonaktiebolaget LM Ericsson (publ), Stockholm (SE)

(72) Inventors: Andreas Nilsson, Gothenburg (SE); Sven Jacobsson, Gothenburg (SE); Fredrik Athley, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/954,003

(22) Filed: Nov. 20, 2024

Related U.S. Application Data (63) Continuation of application No. PCT/SE2024/050925, filed on Oct. 31, 2024.

(51) Int. Cl.
*H04W 72/02* (2009.01)
*H04B 7/06* (2006.01)
*H04W 24/10* (2009.01)

(52) U.S. Cl.
CPC .......... *H04W 72/02* (2013.01); *H04B 7/0695* (2013.01); *H04W 24/10* (2013.01)

(58) Field of Classification Search
CPC ..... H04W 72/02; H04W 24/10; H04B 7/0695
See application file for complete search history.

(56) References Cited

U.S. PATENT DOCUMENTS

| | | | |
|---|---|---|---|
| 11,937,328 B2 * | 3/2024 | Zhang | H04W 24/10 |
| 2022/0304038 A1 * | 9/2022 | Zhang | H04B 7/088 |
| 2023/0299921 A1 * | 9/2023 | Rahman | H04L 5/0094 |
| | | | 370/329 |
| 2023/0318685 A1 | 10/2023 | Zhu et al. | |
| 2024/0014877 A1 | 1/2024 | Zhu et al. | |
| 2024/0187077 A1 * | 6/2024 | Karjalainen | H04B 7/06952 |
| 2025/0031061 A1 * | 1/2025 | Chen | H04W 24/10 |

OTHER PUBLICATIONS

QUALCOMM "Breaking the wireless barriers to mobilize 5G NR mmWave" Qualcomm_tech; May 2019, consisting of 57 pages.
3GPP TS 38.331 V18.3.0 3rd Generation Partnership Project; Technical Specification Group Radio Access Network; NR; Radio Resource Control (RRC) protocol specification (Release 18); Sep. 2024, consisting of 1694 pages.
International Search Report and Written Opinion dated May 27, 2025 for International Application No. PCT/SE2024/050925 filed Oct. 31, 2024, consisting of 19 pages.

\* cited by examiner

*Primary Examiner* — Rhonda L Murphy
(74) *Attorney, Agent, or Firm* — Weisberg I.P. Law, P.A.

(57) ABSTRACT

A method and user equipment (UE) for providing beam reports for UEs that use different kinds of antenna panels are disclosed. According to one aspect, a method includes performing a first performance measurement on a first beam associated with a first antenna panel having a first panel property. The method also includes performing a second performance measurement of a second beam associated with a second antenna panel having a second panel property. The method further includes selecting one of the first beam and the second beam based at least in part on the first panel property and the second panel property. The process also includes transmitting a beam report including the selected one of the first beam and the second beam.

12 Claims, 8 Drawing Sheets

*PRIOR ART*

USER EQUIPMENT (UE) BEAM REPORTS FOR UES WITH DIFFERENT KINDS OF UE PANELS

CROSS REFERENCE TO RELATED APPLICATION

This application is a continuation of International Application No. PCT/SE2024/050925 filed on Oct. 31, 2024, the entirety of which is incorporated herein by reference.

TECHNICAL FIELD

The present disclosure relates to wireless communications, and in particular, to user equipment (UE) beam reports for UEs with different kinds of UE panels.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and user equipment (UE), as well as communication between network nodes and between UEs. The 3GPP is also developing standards for Sixth Generation (6G) wireless communication networks.

The Institute of Electrical and Electronic Engineers (IEEE) has developed and continues to develop standards for wireless communication networks, including Wireless Local Area Networks (WLANs), branded as "Wi-Fi" networks by the Wi-Fi Alliance. WLANs include wireless communication between access points (AP STAs) and non-access point stations (non-AP STAs). Such IEEE standards include IEEE 802.11a/b/g/n/ac/ax/be/bn and IEEE 802.15.

D-MIMO Operation

A distributed multiple input-multiple output (D-MIMO) system is a system with multiple geographically distributed antenna panels, possibly with respective radio and processing units, where such panels jointly coordinate aspects of their transmissions (and receptions) in order to serve one or more UEs. One type of D-MIMO deployment involves coordinating macro gNBs, as considered in the 3GPP Technical Release 18 (3GPP Rel-18) MIMO Working Item. Another type of D-MIMO deployment widely considered as a candidate 6G D-MIMO deployment, includes dense, localized deployments where several small-sized, low-powered panels/nodes are densely deployed in a specific part of the cell requiring a capacity/reliability enhancement (e.g., in crowded parts of the macro cell area such as public squares or stadiums).

In the context of macro deployments, the D-MIMO panels and respective radio and processing units, are termed transmission/reception points (TRPs). In the context of dense localized deployments, the D-MIMO panels, and respective radio and processing units, are termed access points (APs). The terms TRPs and APs are used interchangeably in this disclosure.

There exist different levels of coordination between TRPs which allow for different D-MIMO transmission modes. These modes range from:
Non-coherent joint transmissions, e.g., where the same or different layers may be transmitted from different TRPs without per-TRP precoding accounting for the instantaneous (amplitude and) phase of the downlink (DL) channel; to
Coherent joint transmissions (CJTs), where the same layer(s) is sent from different TRPs, and precoded per-TRP, such that the signals associated with the different TRP layer transmissions add-up constructively at the spatial location where the intended UE is.

When it comes to high bands, D-MIMO systems may be used with the aim of improving coverage, reliability, and mobility, as opposed to spectral efficiency as in mid-bands. Non-coherent joint transmission schemes are the major types of transmission schemes considered for high bands, since inter-TRP phase calibration needed for CJTs is more challenging to perform at high bands, because of a tighter link budget and because the phase noise at high frequencies may make CJT infeasible.

Beam Management Procedure

In the high frequency range (FR2), multiple radio frequency (RF) beams may be used to transmit and receive signals at a network node (e.g., gNB) and a UE. For each DL beam from a network node, there is typically an associated best UE Rx beam for receiving the signals sent from such network node DL beam. The network node DL beam and the associated UE Rx beam form a beam pair. Suitable beam pairs may be identified through a so-called beam management procedure in NR.

A DL beam is (typically) identified by an associated DL reference signal (RS) transmitted in the beam, either periodically, semi-persistently, or aperiodically. The DL RS may be a Synchronization Signal (SS) and Physical Broadcast Channel (PBCH) block (SSB) or a Channel State Information RS (CSI-RS). By measuring, e.g., all the DL CSI-RSs, the UE may determine and report to the network node the best DL beam to use for DL transmissions. The network node may then transmit a burst of DL-RS in the reported best DL beam to let the UE evaluate candidate UE receive (RX) beams.

Figure 1:
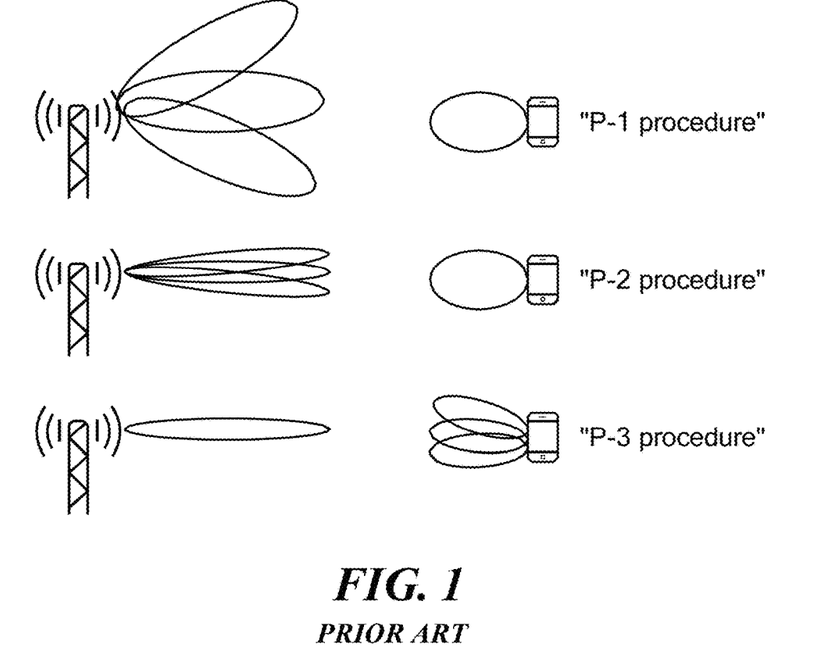
FIG. 1 is an illustration of an example beam management procedure.

Although not explicitly stated in the NR specification, beam management has been divided into three procedures, schematically illustrated in FIG. 1:
P-1: Purpose is to find a coarse direction for the UE using wide network node TX beam covering the whole angular sector;
P-2: Purpose is to refine the network node transmit (TX) beam by doing a new beam search around the coarse direction found in P1; and
P-3: Used for a UE that has analog beamforming to find a suitable UE RX beam.

P-1 is expected to utilize beams with rather large beamwidths and where the beam reference signals are transmitted periodically and are shared between all UEs of the cell. Typically, reference signals for P-1 are periodic CSI-RSs or SSBs. The UE then reports the N best beams to the network node and, e.g., their corresponding reference signal received power (RSRP) values.

P-2 is expected to use aperiodic CSI-RS transmitted in narrow beams around the coarse direction found in P-1.

P-3 is expected to use aperiodic CSI-RSs repeatedly transmitted in one narrow network node beam.

An alternative to the P-3 procedure for UE beam finding, is to let the UE determine a suitable UE RX beam based on the periodic SSB transmission. However, using SSB to let the UE determine its UE RX beam may be slow, resulting in degraded performance for moving UEs. Hence CSI-RS based P3 beam sweep is expected to be implemented in mmWave products.

UE Analog Beamforming Architecture

Signals may arrive at a UE from many different directions. Hence, it is beneficial to have an antenna implementation at the UE which has the possibility to generate beams in all possible directions. One way to increase such omni-directional coverage at a UE is to install multiple panels, and point the panels in different directions, which typically is the case for commercial UEs. However, in order to reduce cost and energy consumption, these UEs might only be able to transmit and receive from one or a subset of all UE panels at each time instance.

Figure 2:
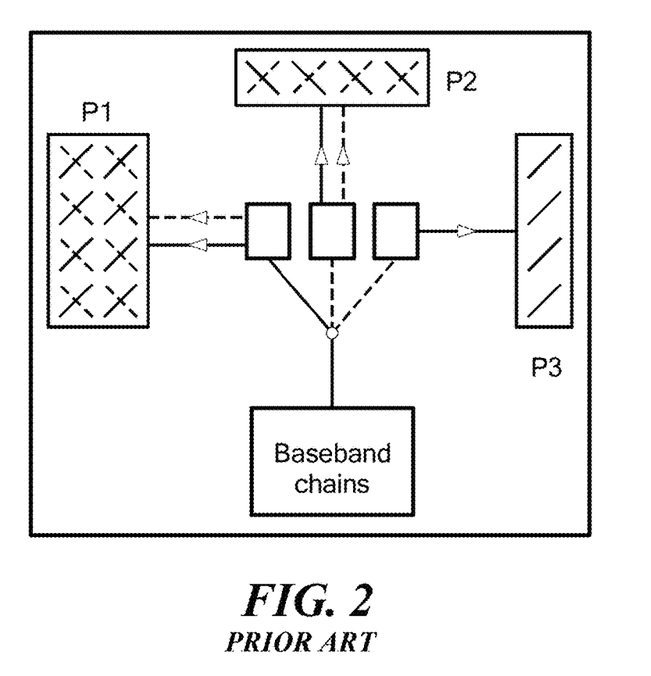
FIG. 2 is an illustration of a user equipment (UE) with three panels pointing in different directions.

FIG. 2 illustrates one example of a UE with two baseband chains (one per polarization). There are three antenna panels, and which of the three panels connects to the baseband chains depends on the current configuration of the switch circuitry. Different UE panels in commercial UEs are typically equipped with different numbers of TX/RX chains (which determines the maximum number of DL/UL layers for that panel), as well as different number of antenna elements (which determines the maximum achievable beamforming gain), The number of antenna elements also determines the number of orthogonal beams that the UE panels support. More antenna elements in a UE panel increases the number of orthogonal beams the UE panel supports. In the example below, UE panel 1 (P1) and UE panel 2 (P2) has two TX/RX chains (supporting a maximum of two simultaneous DL/UL layers each). The UE panel 3 (P3) has only a single TX/RX chain, and only supports a single DL/UL layer.

Figure 3:
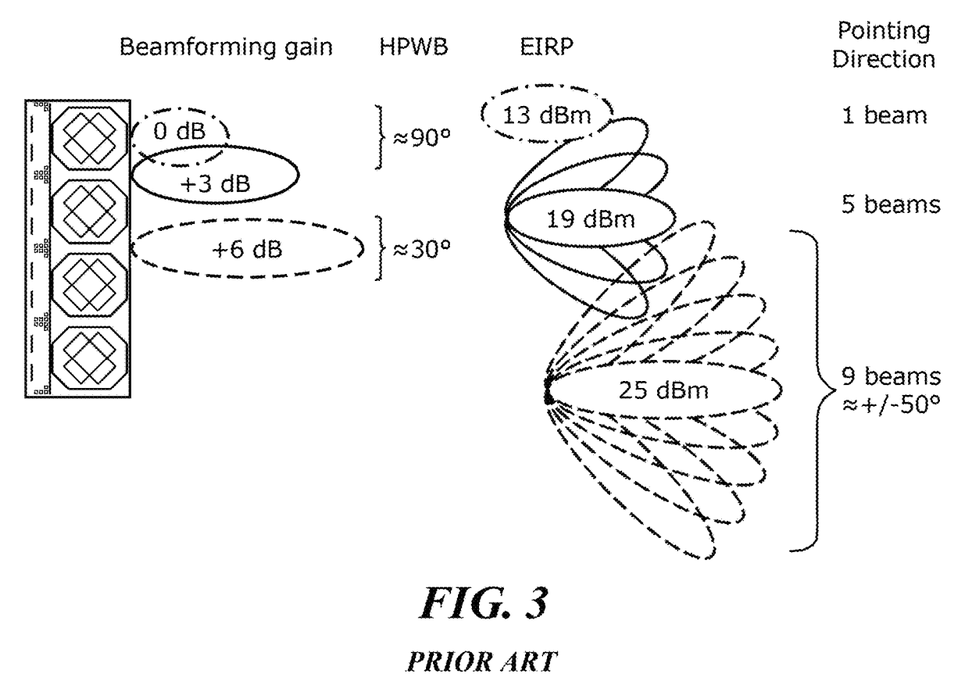
FIG. 3 illustrates a UE with different beam widths.

Typically, a UE panel of a commercial UE may generate beams of different beam widths, as illustrated in the FIG. 3. Typically, commercial UEs generate the wider beams by turning off one or multiple PAs of the panel, which has a negative impact on the available output power. However, it is possible to mitigate the power loss when generating wide beams by applying dual-polarized beamforming (e.g., using array size invariant (ASI) beamforming). It is useful for the UE to generate a wide beam of a panel during beam sweep procedures to first find a coarse direction to a serving AP/TRP, which would enable the UE to select and activate a suitable UE panel. In this example, the UE may generate one wide beam, 5 half-wide beams, and 9 narrow beams for each panel.

Maximum Permissible Exposure (MPE)

In 3GPP, two methods have been introduced to enable the UE to comply with regulatory exposure limits; reduced maximum output power (referred to as P-MPR) and reduced UL transmission duty cycle.

For FR2, maxUplinkDutyCycle-FR2 is a UE capability and indicates the maximum percentage of symbols during 1 second that may be scheduled for uplink transmission regulatory exposure limits.

In case the field of UE capability max UplinkDutyCycle-FR2 is not present or is present but the percentage of uplink symbols transmitted within any 1 s evaluation period is larger than maxUplinkDutyCycle-FR2, the UE may apply P-MPR to meet the regulatory exposure limits. By applying P-MPR the UE may reduce the maximum output power for a UE power class with x number of dB (where the range of x may be one of {3≤P-MPR<6, 6≤P-MPR<9, 9≤P-MPR<12, P-MPR≥12} dB). For example, for UE power class 2 with a P-MPR value x=10 dB, the UE is allowed to reduce the maximum output power (Pcmax) from 23 dBm to 13 dBm (23 dBm–10 dB=13 dBm). Due to P-MPR and maxUplinkDutyCycle-FR2, the maximum uplink performance of a selected UL transmission path may be significantly deteriorated.

Since the MPE issue may be highly directional in FR2, required P-MPR and maxUplinkDutyCycle-FR2 would be uplink beam specific and would very likely be different among different candidate uplink beams across different UE panels. This means that certain beams/panels, e.g., beams that may be pointing towards human body, may have relatively high required P-MPR and/or low duty cycle while some other beams/panels, e.g., beams that may not be pointing towards human body, may have relatively low required P-MPR and/or high duty cycle.

For beam reports it is typically assumed that the UE reports the beam(s) associated with highest RSRP or highest signal to interference plus noise ratio (SINR) (depending on whether the UE is configured to report RSRP or SINR). However, when UEs are equipped with different UE panels with different numbers of TX/RX chains, the beam with highest RSRP or SINR is not always the preferred one, since it might be associated with, for example, fewer RX/TX chains, and/or P-MPR event.

SUMMARY

Some embodiments advantageously provide methods and user equipment for beam reports for UEs with different kinds of UE panels.

In some embodiments, the UE evaluates not only RSRP/SINR for a beam report, but also takes other metrics into account (e.g., number of TX/RX chains of an associated UE panel) when determining which beam to include in a beam report and/or which UE panel to associated to a reported beam.

For example, suppose a first measured TRP beam (e.g., an SSB beam) has lower RSRP/SINR than a second measured TRP beam, and suppose the second measured TRP beam is the TRP beam with highest measured RSRP/SINR of all TRP beams. Further suppose that the first measured TRP beam is associated with a UE panel that has a greater number of TX and/or RX chains than the second TRP beam. In this case, the UE panel having the greater number of TX/RX chains may be expected to give higher DL and/or UL throughput, and therefore the UE may include the first TRP beam in the beam report instead of the second TRP beam.

An advantage of some embodiments is that the network node may schedule the UE based on not only highest RSRP/SINR, but also based on possible rank and user throughput, which may improve DL and/or UL user throughput.

According to one aspect, a method in a user equipment, UE, for selecting a beam is provided. The method includes performing a first performance measurement on a first beam associated with a first antenna panel having a first panel property. The method also includes performing a second performance measurement of a second beam associated with a second antenna panel having a second panel property. The method includes selecting one of the first beam and the second beam based at least in part on the first panel property and the second panel property. The method further includes transmitting a beam report including the selected one of the first beam and the second beam.

According to this aspect, in some embodiments, the first panel property is a first number of transmit/receive chains of the first antenna panel and the second panel property is a second number of transmit/receive chains of the second antenna panel. In some embodiments, selecting one of the first and second beams is based in part on the first and second performance measurements. In some embodiments, selecting one of the first and second beams is based at least in part on a maximum permissible output power associated with each of the first and second antenna panels. In some embodiments, selecting one of the first and second beams is based at least in part on a rank associated with each of the first and second antenna panels. In some embodiments, selecting one of the first and second beams is based at least in part on a throughput associated with each of the first and second antenna panels. In some embodiments, selecting one of the first and second beams is based at least in part on at least one of a data buffer status, a priority of data and a latency constraint. In some embodiments, selecting one of the first and second beams is based at least in part on comparison of at least one of the first and second performance measurements to a threshold. In some embodiments, selecting one of the first and second beams includes selecting the first beam when the first number of transmit/receive chains is greater than the second number of transmit/receive chains and when a difference between the first performance measurement and the second performance measurement does not exceed a threshold. In some embodiments, when the second performance measurement is greater than the first performance measurement, selecting and reporting the first beam in the beam report. In some embodiments, when the second performance measurement does not exceed the first performance measurement by a threshold, selecting and reporting the first beam in the beam report.

According to another aspect, a user equipment, UE, for selecting a beam is provided. The UE includes processing circuitry configured to perform a first performance measurement on a first beam associated with a first antenna panel having a first panel property. The processing circuitry is also configured to perform a second performance measurement of a second beam associated with a second antenna panel having a second panel property. The processing circuitry is also configured to select one of the first beam and the second beam based at least in part on the first panel property and the second panel property. The processing circuitry is also configured to transmit a beam report including the selected one of the first beam and the second beam.

According to this aspect, in some embodiments, the first panel property is a first number of transmit/receive chains of the first antenna panel and the second panel property is a second number of transmit/receive chains of the second antenna panel. In some embodiments, selecting one of the first and second beams is based in part on the first and second performance measurements. In some embodiments, selecting one of the first and second beams is based at least in part on a maximum permissible output power associated with each of the first and second antenna panels. In some embodiments, selecting one of the first and second beams is based at least in part on a rank associated with each of the first and second antenna panels. In some embodiments, selecting one of the first and second beams is based at least in part on a throughput associated with each of the first and second antenna panels. In some embodiments, selecting one of the first and second beams is based at least in part on at least one of a data buffer status, a priority of data and a latency constraint. In some embodiments, selecting one of the first and second beams is based at least in part on comparison of at least one of the first and second performance measurements to a threshold. In some embodiments, selecting one of the first and second beams includes selecting the first beam when a first number of transmit/receive chains of the first antenna panel is greater than a second number of transmit/receive chains of the second antenna panel and when a difference between the first performance measurement and the second performance measurement does not exceed a threshold. In some embodiments, when the second performance measurement is greater than the first performance measurement, selecting and reporting the first beam in the beam report. In some embodiments, when the second performance measurement does not exceed the first performance measurement by a threshold, selecting and reporting the first beam in the beam report.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail example embodiments, it is noted that the embodiments reside primarily in combinations of apparatus components and processing steps related to user equipment (UE) beam reports for UEs with different kinds of UE panels. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein may be any kind of network node comprised in a radio network which may further comprise any of a base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The network node may be or contain a TRP. The term "radio node" used herein may be used to also denote a user equipment (UE) such as a wireless device (WD) or a radio network node.

In some embodiments, the non-limiting terms wireless device (WD) or a user equipment (UE) are used interchangeably. The UE herein may be any type of wireless device capable of communicating with a network node or another UE over radio signals, such as a wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It may be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a network node may be distributed over a plurality of user equipments and/or network nodes. In other words, it is contemplated that the functions of the network node and user equipment described herein are not limited to performance by a single physical device and, in fact, may be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to user equipment (UE) beam reports for UEs with different kinds of UE panels.

Figure 4:
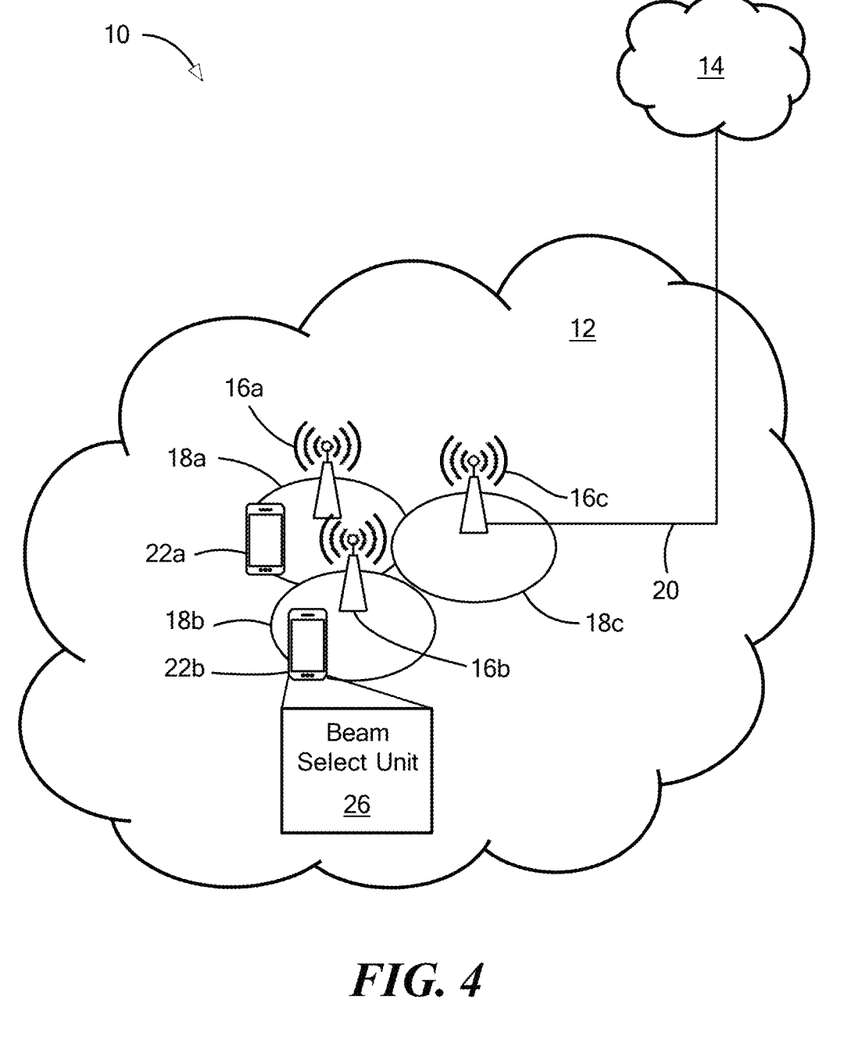
FIG. 4 is a schematic diagram of an example network architecture illustrating a communication system according to principles disclosed herein.

Returning to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first user equipment (UE) 22a located in coverage area 18a is configured to wirelessly connect to, or be paged by, the corresponding network node 16a. A second UE 22b in coverage area 18b is wirelessly connectable to the corresponding network node 16b. While a plurality of UEs 22a, 22b (collectively referred to as user equipments 22) are illustrated in this example, the disclosed embodiments are equally applicable to a situation where a sole UE is in the coverage area or where a sole UE is connecting to the corresponding network node 16. Note that although only two UEs 22 and three network nodes 16 are shown for convenience, the communication system may include many more UEs 22 and network nodes 16.

Also, it is contemplated that a UE 22 may be in simultaneous communication and/or configured to separately communicate with more than one network node 16 and more than one type of network node 16. For example, a UE 22 may have dual connectivity with a network node 16 that supports LTE and the same or a different network node 16 that supports NR. As an example, UE 22 may be in communication with an eNB for LTE/E-UTRAN and a gNB for NR/NG-RAN.

A user equipment 22 is configured to include a beam select unit 26 which is configured to select one of the first beam and the second beam based at least in part on the first panel property and the second panel property. Non-limiting examples of panel properties include the number of TX/RX chains, number of antenna elements per antenna panel and maximum output power per antenna panel. A larger number of antenna elements in an antenna panel may be expected to provide a larger beamforming gain and link budget, as compared to an antenna panel with fewer antenna elements. A higher maximum power of an antenna panel may be expected to provide a higher maximum achievable uplink budget.

Example implementations, in accordance with an embodiment, of the UE 22 and network node 16 discussed in the preceding paragraphs will now be described with reference to FIG. 5.

The communication system 10 includes a network node 16 provided in a communication system 10 and including hardware 28 enabling it to communicate with the UE 22. The hardware 28 may include a radio interface 30 for setting up and maintaining at least a wireless connection 32 with a UE 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16.

The communication system 10 further includes the UE 22 already referred to. The UE 22 may have hardware 44 that may include a radio interface 46 configured to set up and maintain a wireless connection 32 with a network node 16 serving a coverage area 18 in which the UE 22 is currently located. The radio interface 46 may be formed as or may include, for example, one or more RF transmitters, one or more RF receivers, and/or one or more RF transceivers. The radio interface 46 includes an array of antenna panels 48 to radiate and receive signal(s) carrying electromagnetic waves.

The hardware 44 of the UE 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 56, which is stored in, for example, memory 54 at the UE 22, or stored in external memory (e.g., database, storage array, network storage device, etc.) accessible by the UE 22. The software 56 may be executable by the processing circuitry 50. The software 56 may include a client application 58. The client application 58 may be operable to provide a service to a human or non-human user via the UE 22.

The processing circuitry 50 may be configured to control any of the methods and/or processes described herein and/or to cause such methods, and/or processes to be performed, e.g., by UE 22. The processor 52 corresponds to one or more processors 52 for performing UE 22 functions described herein. The UE 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to UE 22. For example, the processing circuitry 50 of the user equipment 22 may include a beam select unit 26 which is configured to select one of the first beam and the second beam based at least in part on the first panel property and the second panel property.

Figure 5:
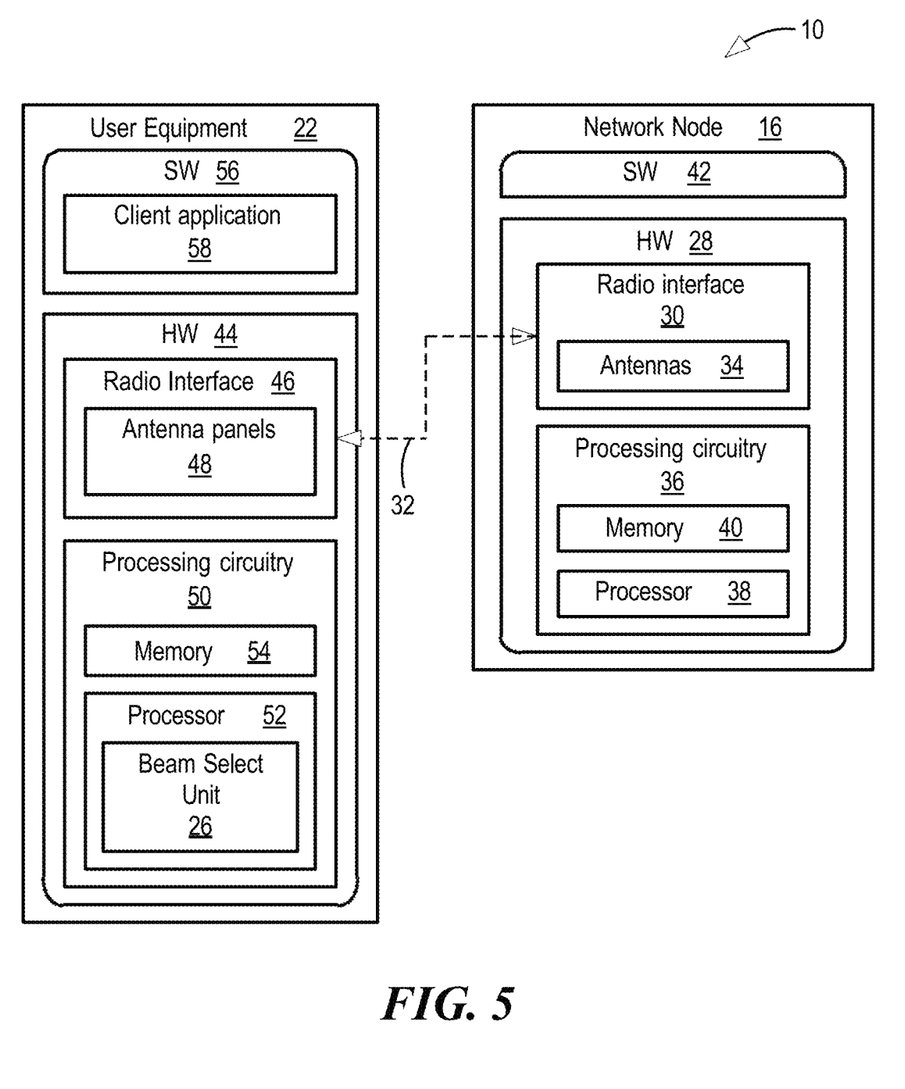
FIG. 5 is a block diagram of a network node in communication with a user equipment over a wireless connection according to some embodiments of the present disclosure.

In some embodiments, the inner workings of the network node 16 and UE 22 may be as shown in FIG. 5 and independently, the surrounding network topology may be that of FIG. 4.

The wireless connection 32 between the UE 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 4 and 5 show various "units" such as beam select unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 6:
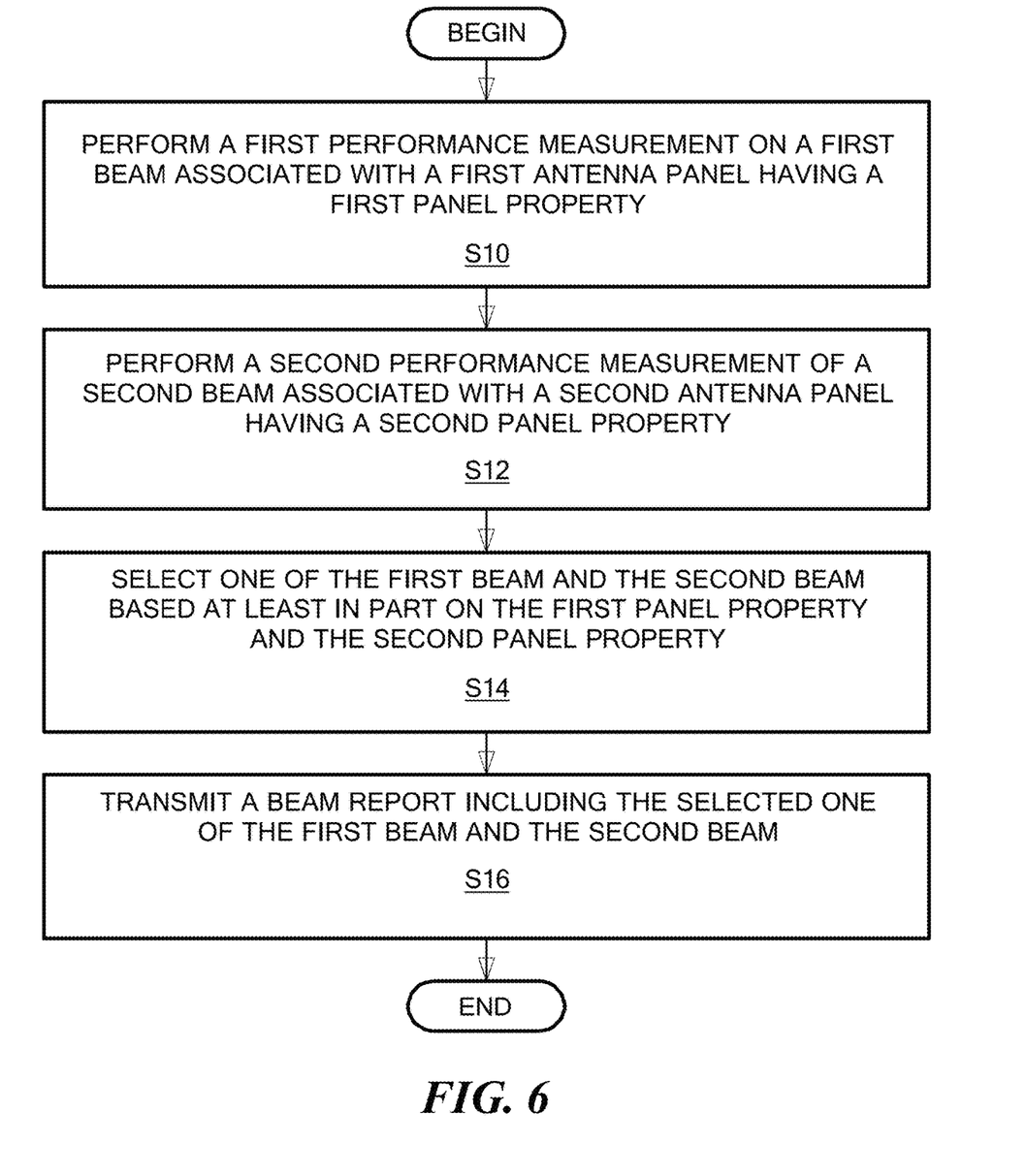
FIG. 6 is a flowchart of an example process in a user equipment for user equipment (UE) beam reports for UEs with different kinds of UE panels according to some embodiments of the present disclosure.

FIG. 6 is a flowchart of an example process in a user equipment 22 according to some embodiments of the present disclosure. One or more blocks described herein may be performed by one or more elements of user equipment 22 such as by one or more of processing circuitry 50 (including the beam select unit 26), processor 52, and/or radio interface 46. User equipment 22 such as via processing circuitry 50 and/or processor 52 and/or radio interface 46 is configured to perform a first performance measurement on a first beam associated with a first antenna panel having a first panel property (Block S10). The method also includes performing a second performance measurement of a second beam associated with a second antenna panel having a second panel property (Block S12). The method includes selecting one of the first beam and the second beam based at least in part on the first panel property and the second panel property (Block S14). The method further includes transmitting a beam report including the selected one of the first beam and the second beam (Block S16).

In some embodiments, the first panel property is a first number of transmit/receive chains of the first antenna panel and the second panel property is a second number of transmit/receive chains of the second antenna panel. In some embodiments, selecting one of the first and second beams is based in part on the first and second performance measurements. In some embodiments, selecting one of the first and second beams is based at least in part on a maximum permissible output power associated with each of the first and second antenna panels. In some embodiments, selecting one of the first and second beams is based at least in part on a rank associated with each of the first and second antenna panels. In some embodiments, selecting one of the first and second beams is based at least in part on a throughput associated with each of the first and second antenna panels. In some embodiments, selecting one of the first and second beams is based at least in part on at least one of a data buffer status, a priority of data and a latency constraint. In some embodiments, selecting one of the first and second beams is based at least in part on comparison of at least one of the first and second performance measurements to a threshold. In some embodiments, selecting one of the first and second beams includes selecting the first beam when the first number of transmit/receive chains is greater than the second number of transmit/receive chains and when a difference between the first performance measurement and the second performance measurement does not exceed a threshold. In some embodiments, when the second performance measurement is greater than the first performance measurement, selecting and reporting the first beam in the beam report. In some embodiments, when the second performance measurement does not exceed the first performance measurement by a threshold, selecting and reporting the first beam in the beam report.

In some embodiments, the UE 22 is configured by receiving a TRP beam report configuration from a TRP such as a network node 16. The configuration may use radio resource control (RRC) signaling that tells the UE how to perform a TRP beam report. The RRC signalling is for example a CSI-ReportConfig Information Element as specified in 3GPP Technical Standard (TS) 38.331 version 18.3.0, with the reportQuantity parameter set to "CRI-RSRP". One of a first beam and a second beam is selected based at least in part on a first panel property and a second panel property, wherein a first performance measurement on the first beam is associated with a first antenna panel having the first panel property, and a second performance measurement of the second beam is associated with a second antenna panel having the second panel property. The beam report is transmitted to the TRP. The beam report including the selected one of the first beam and the second beam.

Having described the general process flow of arrangements of the disclosure and having provided examples of hardware and software arrangements for implementing the processes and functions of the disclosure, the sections below provide details and examples of arrangements for user equipment (UE 22) beam reports for UEs with different kinds of UE panels 48.

Figure 7:
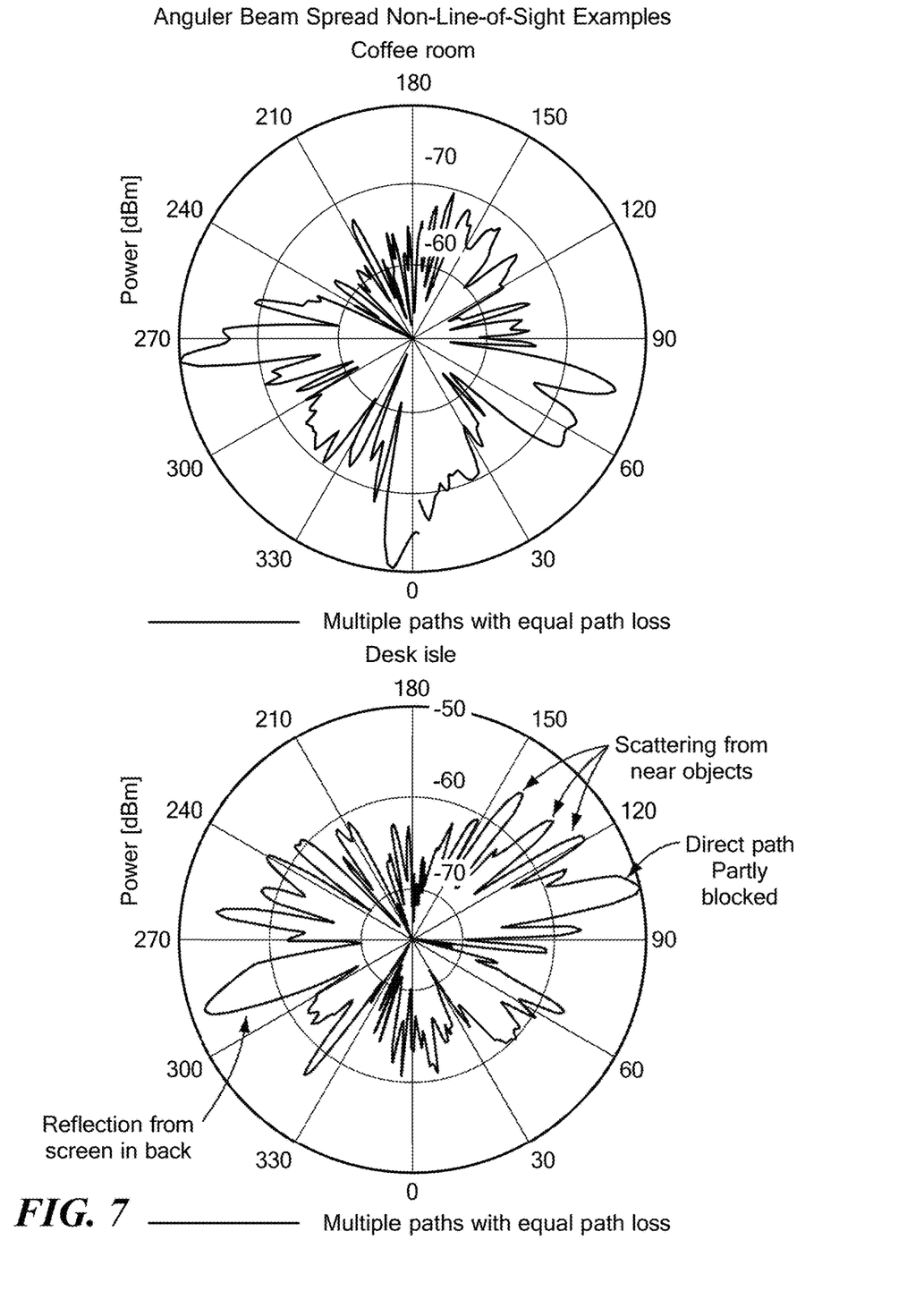
FIG. 7 illustrates example path loss for a mmWave UE in an indoor scenario.

In non-line of sight (NLOS) scenarios, as shown in FIG. 7, several different paths from different directions may be seen with similar path loss. Assume, for example, that the different panels 48 have similar RSRP, but one of the panels 48 has two TX/RX chains instead of one TX/RX chain. In practice, the user throughput may be nearly doubled by choosing a UE panel 48 that has two TX/RX chains instead of a single TX/RX chain. This is because rank 2 rather may be attained by utilizing the two orthogonal polarizations (when the DL and/or UL link budget is sufficiently high).

In addition, if P-MPR is associated with one of the UE panels 48, then an increase in UL output of between 3 dB up to 12 dB may be attained by selecting a UE panel 48 without a P-MPR event. Measurements have shown that the path loss only is reduced with a few decibels when having a body part on top of a UE panel 48 at mmWave frequencies. Therefore, it may be not unlikely that a panel 48 that is blocked by a body part still may have highest RSRP. This may increase the UL throughput by several hundred percent (e.g., 300%) depending on the current UL link budget.

In some cases, it may be possible to switch to a UE panel 48 that has both more TX/RX chains and less P-MPR (i.e., higher output power), which means that the effects of user throughput mentioned above may be combined.

Figure 8:
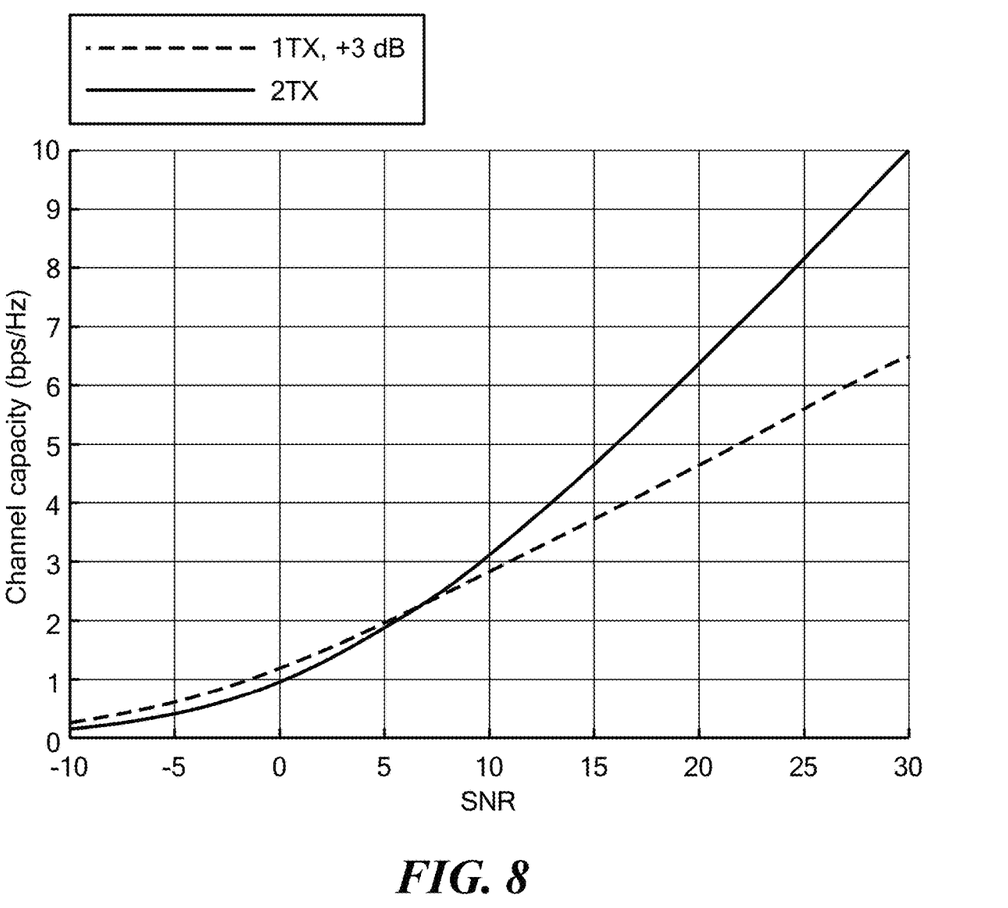
FIG. 8 illustrates an example estimated channel capacity for UE panels with one TX chain and 2TX chains.

A gain achieved in some embodiments is illustrated with an evaluation when different UE panels 48 have different numbers of TX chains. Assume that a UE 22 has two panels 48, panel 1 with 1 TX chain and panel 2 with 2 TX chains. Also assume that the total TX power is the same for both panels 48. FIG. 8 shows estimated channel capacity for a frequency-selective Rayleigh fading MIMO channel as a function of UL signal to noise ratio (SNR). For the panel 48 with 1 TX chain, it may be assumed that the path gain is 3 dB higher than for the panel 48 with 2 TX chains. This corresponds to a 3 dB higher RSRP for panel 1. It may be seen in FIG. 8 that for low SNR, panel 1 gives slightly higher capacity but for medium and high SNR, panel 2 gives significantly higher capacity. Hence, since panel 2 has 2 TX chains, higher UL throughput may be expected with this panel 48 for a wide range of SNR despite lower RSRP. This demonstrates that using known methods of selecting a panel 48 based on RSRP may be expected to give lower performance compared to the methods disclosed herein.

Figure 9:
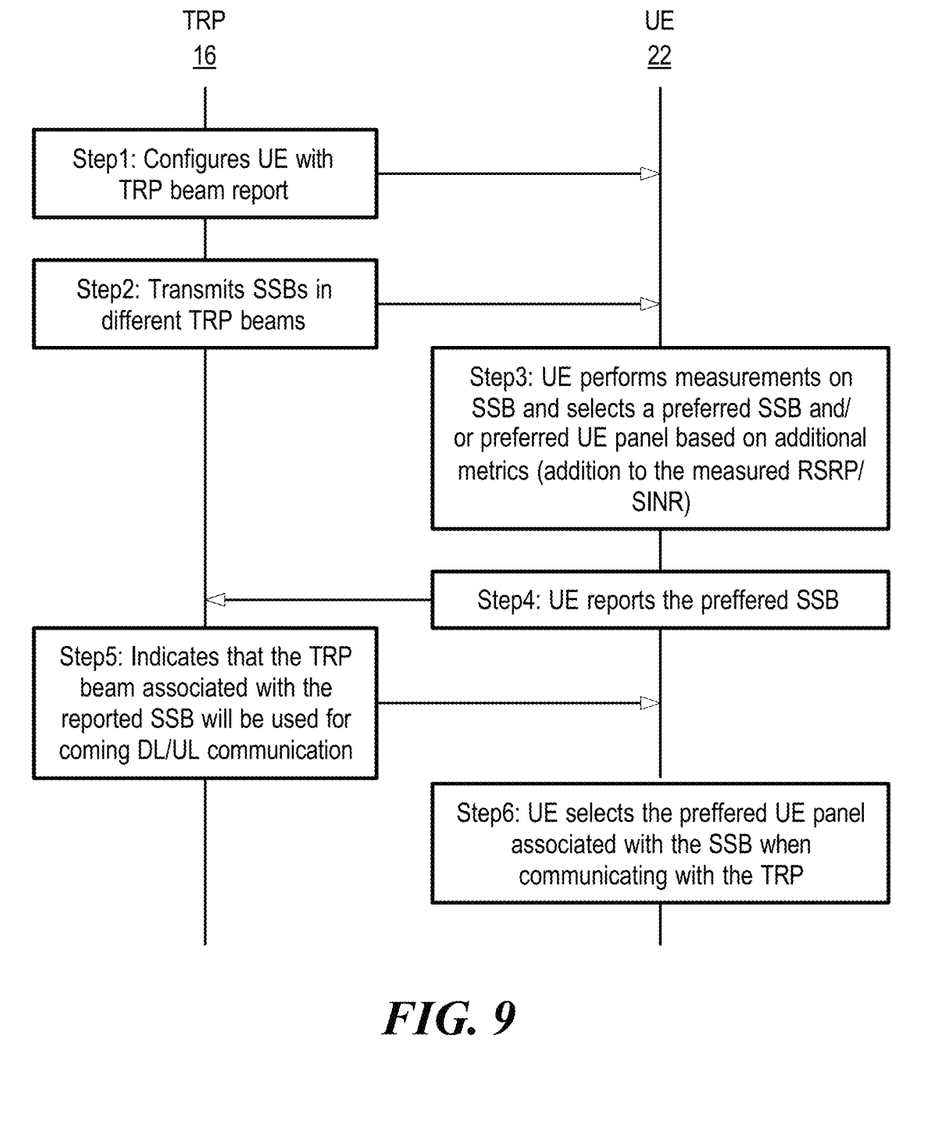
FIG. 9 is a flowchart of an example process for providing UEs with different kinds of UE panels according to some embodiments of the present disclosure.

FIG. 9 is a flowchart of one example embodiment related to selecting TRP beams and UE panels 48 according to principles disclosed herein. As used herein, a TRP may be a network node 16 or a portion of a network node 16, and will be referred to below as TRP 16 and/or network node 16

In Step 1, the TRP 16 configures the UE 22 with a TRP beam report. The TRP beam report may for example be based on SSBs or CSI-RS (or a similar new downlink reference signal in 6G). In some embodiments, the UE 22 receives the beam report configuration from the TRP 16 via radio resource control (RRC) signaling, which instructs the UE 22 how to perform the TRP beam report. As noted above, the RRC signaling may include a CSI-ReportConfig Information Element (IE) with the reportQuantity parameter set to "CSI-RSRP".

In Step 2, the TRP 16 transmits SSBs in different TRP beams, and in Step 3, the UE 22 performs measurements on these SSBs. The SSB may be transmitted periodically, in different SSB bursts (typically every 20 ms) and it is expected that the UE 22 uses different UE panels 48/UE beams when receiving different SSB bursts to make sure that the best possible beam pair link is determined between the TRP 16 and the UE 22.

Traditionally, it may be assumed that the UE 22 measures RSRP or SINR of the SSBs and includes the K beams with the highest RSRP/SINR in the associated beam report (where K=1,2,4). However, considering that different UE panels 48 may have different DL/UL capabilities (e.g., different numbers of TX and/or RX chains), and/or different P-MPR events, reporting TRP beams based only on measured RSRP or SINR may be sub-optimal.

In Step 3, different methods are disclosed to enhance the TRP beam selection and/or UE panel selection for a beam report.

Embodiments Related to Selecting TRP Beams in the TRP Beam Report

In some embodiments, the UE 22 selects a TRP beam to include in a TRP beam report (at least partly) based on the number of TX and/or RX chains for the UE panel 48 associated with the different TRP beams of the TRP beam report procedure. In some embodiments, when a first TRP beam has lower measured RSRP/SINR than a second TRP beam, and when the first TRP beam is associated with a UE panel 48 with more TX and/or RX chains than the UE panel 48 associated with the second TRP beam, then the UE 22 includes a first TRP beam in a beam report but does not include a second TRP beam in the beam report.

In some embodiments, instead of, or in addition to, using the number of TX/RX chains of the associated UE panel 48 to determine which beam to include in the beam report, the UE 22 may be configured to consider one or more of the following metrics:
   P-MPR associated with the UE panel 48;
   Number of antenna elements in each UE panel 48.
   Maximum output power of each UE panel 48.
   Estimated rank of potential upcoming DL/UL communication for a TRP beam and a UE panel 48 (which, e.g., may be based on number of TX/RX chains of the UE panel 48, as well as the measured performance metric (such as RSRP or SINR)); and/or
   Estimated user throughput of potential upcoming DL/UL communication for a TRP beam and a UE panel 48 (which, e.g., may be based on number of TX/RX chains of the UE panel 48, as well as the measured performance metric (e.g., RSRP or SINR).

In some embodiments, assume that the UE 22 receives a first SSB transmitted in a first TRP beam (TRP beam 1) using a first UE panel 48 (UE panel 1) and that the UE 22 receives a second SSB transmitted in a second TRP beam (TRP beam 2) using a second UE panel 48 (UE panel 2). Further assume that the RSRP/SINR is slightly higher for TRP beam 1 than for TRP beam 2 and assume that UE panel 2 has two TX/RX chains and UE panel 1 has only a single TX/RX chain. In this case, the UE 22 may select to report TRP beam 2 instead of TRP beam 1, since the beam pair link associated with TRP beam 2 has higher estimated user throughput (or similar performance metric) than TRP beam 1.

In some embodiments, the selection of TRP beam to include in a beam report may be based on previous evaluations. In some embodiments, the UE 22 is configured with a predetermined look up table, where the look-up table is used to estimate user throughput as a function of received RSRP/SINR of a TRP beam and the number of TX/RX chains of the UE panel 48 used to receive the TRP beam.

In some embodiments, separate estimated user throughputs are used for DL and UL.

In some embodiments, a threshold X dB is used such that if the RSRP/SINR for a first TRP beam received with a first UE panel 48 with a single TX/RX chain more than X dB greater than the RSRP of a second TRP beam received with a second UE panel 48 with two TX chains, the UE 22 may be configured to select the first TRP beam. If the RSRP/SINR for the first TRP beam received with the first UE panel 48 with a single TX/RX chain exceeds the RSRP/SINR of the second TRP beam by less than X dB, then the UE 22 may select the second TRP beam.

In some embodiments, an absolute threshold may be used when selecting TRP beams, such that if a TRP beam has lower RSRP then a certain level (e.g., RSRP smaller than −130 dBm), the UE 22 does not select that TRP beam (regardless of the number of TX/RX chains the associated UE panel 48 has).

In some embodiments, in case a certain UE panel 48 has a best estimated performance in the DL and another UE panel 48 has a best estimated performance in the UL (which may happen for example when the link budget is different due to different output power in DL and UL), the UE 22 may determine a UE panel 48 depending on the buffer status, e.g., depending on whether the UE 22 is expected to transmit more data in the DL or transmit more data in UL for the foreseeable future. Besides the amount of data, the service priority of the data may also be considered when selecting a UE panel 48. For example, UL live video streaming may be prioritized over file download. For low latency services, the UE 22 may select panel 48 based on estimated latency instead of estimated throughput.

Embodiments Related to Selecting UE Panels for a Certain TRP Beam

In some embodiments, the UE 22 measures two performance values for one TPR beam using two different UE panels 48, where a first performance value is associated with a first UE panel 48 and a second performance value is associated with a second UE panel 48. The first performance value may be lower than the second performance value and the UE 22 may include the first performance value in a report together with the TRP beam. In some embodiments, the first UE panel 48 has more RX chains than the second UE panel 48. In some embodiments, the first UE panel 48 has more TX chains than the second UE panel 48. In some embodiments, the first UE panel 48 has less P-MPR than the second UE panel 48.

In some embodiments, the UE 22 takes the available TX power per panel 48 into account when selecting a UE panel 48. This may be useful if PAs with different maximum power are used for different panels 48.

In some embodiments, the UE 22 takes potential differences in P-MPR between UE panels 48 into account when selecting a UE panel 48. This may be relevant, e.g., when one panel 48 is facing a human body and the TX power is to be reduced for that panel 48.

In some embodiments, the UE 22 takes potential UE panel 48 overheating into account when selecting a UE panel 48.

In Step 4, the UE 22 reports the SSB beam and corresponding performance metric.

In Step 5, the network indicates that the reported TRP beam (SSB) may be used for upcoming DL and/or UL communication (e.g., by activating/indicating an associated transmission configuration indicator (TCI) state).

In Step 6, the UE 22 applies a UE panel 48 determined in Step 3 for the coming DL/UL communication associated with the indicated TRP beam.

One or more effects of some embodiments disclosed herein may be detected as follows.

Consider two transmission points, where one SSB is transmitted from each respective TRP 16, and where a first TRP 16 is directed towards a first UE panel 48, and a second TRP 16 is directed towards a second UE panel 48; and where the first and second UE panel 48 have different number of RX/TX chains. The UE 22 may report the RSRP of the SSBs. By changing the output power of respective SSB, the RSRP may be controlled per SSB and per UE panel 48. When the UE 22 reports a first SSB, the first SSB may be associated with lower RSRP than the second SSB, but the first SSB may be associated with a UE panel 48 with more TX and/or RX chains. The number of RX/TX chains in different panels 48 may be examined by visual inspection after disassembling the device or in some cases from information from the chipset vendor.

In another example for a UE 22 with two UE panels 48, a single TRP system may deployed where two different SSBs are transmitted in different directions, and where the first SSB mainly illuminates a first UE panel 48, and the second SSB mainly illuminates the second UE panel 48 (which may be organized by reflectors and verified by measurements of RSRP while blocking a UE panel 48, etc.). Then a finger may be placed over or close to one of the UE panels 48, causing an P-MPR event which may cause the UE 22 to reduce the output power for that UE panel 48 with say, 10 dBm (possible reported values according to NR 3GPP specification are $\{3 \leq \text{P-MPR} < 6, 6 \leq \text{P-MPR} < 9, 9 \leq \text{P-MPR} < 12, \text{P-MPR} \geq 12\}$ dB). Then, by adapting the output power of a respective SSB, which impacts the RSRP of the respective SSB, the UE 22 may select a SSB not only based on RSRP, but also based on P-MPR. The UE panel 48 is associated with the reported SSB may be detected by analyzing the TX state of the different UE panels 48 during following DL and/or UL transmissions.

Some embodiments may include one or more of the following:

Example A1. A method for selecting a TRP beam and/or UE antenna panel 48 associated with a TRP beam report, where the UE 22 has at least two antenna panels 48, the method comprising:

a. Measuring for a first TRP beam a first performance value associated with a first UE panel 48, measuring for a second TRP beam a second performance value associated with a second UE panel 48;

b. Determining that the second performance value is larger than the first performance value;

c. Reporting to the network node 16 the first TRP beam and the first performance value.

Example A2. Example A1 and where at least two UE antenna panels 48 have different number of TX and/or Rx chains.

Example A3. Example A1 and where the performance value is associated with one of the following performance metrics:

a. RSRP;

b. Reference Signal Received Quality (RSRQ);

c. SINR.

Example A4. Example A1 and where the first TRP beam and the second TRP beam is the same beam (i.e., the UE 22 (only) selects a preferred UE panel 48 for a reported TRP beam).

Example A5. Example A1 and where the first TRP beam and the second TRP beam are different beams (i.e., the UE 22 selects a preferred TRP beam partly based on which UE panel 48 it is associated with).

Example A6. Example A1 and where the first TRP beam has higher estimated user throughput of potential upcoming DL/UL communication than the second TRP beam.

Example A7. Examples A1 and A2 and where the first UE panel 48 has more TX chains than the second UE panel 48.

Example A8. Examples A1 and A2 and where the first UE panel 48 has more RX chains than the second UE panel 48.

Example A9. Example A1 and where the second panel 48 has been affected by P-MPR, while the first panel 48 has not.

Example A10. Example A1 and where the second panel 48 has been affected by a larger P-MPR than the first panel 48.

Example A11. Example A1 and where the network indicates to the UE 22 that the reported TRP beam will be used for coming DL communication, and the UE 22 applies the first UE panel 48 when performing the associated DL reception.

Example A12. Example A1 and where the network indicates to the UE 22 that the reported TRP beam will be used for coming UL communication, and the UE 22 applies the first UE panel 48 when performing the associated UL transmission.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that may be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments may be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a user equipment (UE) for selecting a beam, the method comprising:
    performing a first performance measurement on a first beam associated with a first antenna panel having a first number of transmit/receive chains;
    performing a second performance measurement of a second beam associated with a second antenna panel having a second number of transmit/receive chains, the first and second performance measurements being one of a reference signal received power (RSRP) and a signal to interference plus noise ratio (SINR);
    selecting the first beam when:
        the first number of transmit/receive chains is greater than the second number of transmit/receive chains; and
        the second performance measurement does not exceed the first performance measurement by a threshold amount;
    otherwise, selecting the second beam; and
    transmitting a beam report indicating the selected one of the first beam and the second beam.

2. The method of claim 1, wherein selecting one of the first and second beams is based at least in part on a maximum permissible output power associated with each of the first and second antenna panels.

3. The method of claim 1, wherein selecting one of the first and second beams is based at least in part on a rank associated with each of the first and second antenna panels.

4. The method of claim 1, wherein selecting one of the first and second beams is based at least in part on a throughput associated with each of the first and second antenna panels.

5. The method of claim 1, wherein selecting one of the first and second beams is based at least in part on at least one of a data buffer status, a priority of data and a latency constraint.

6. The method of claim 1, wherein selecting one of the first and second beams is based at least in part on comparison of at least one of the first and second performance measurements to a threshold.

7. A user equipment (UE) for selecting a beam, the UE comprising:
    a non-transitory memory; and
    processing circuitry in communication with the non-transitory memory that includes a computer program to configure the processing circuitry to:
        perform a first performance measurement on a first beam associated with a first antenna panel having a first number of transmit/receive chains;
        perform a second performance measurement of a second beam associated with a second antenna panel having a second number of transmit/receive chains, the first and second performance measurements being one of a reference signal received power (RSRP) and a signal to interference plus noise ratio (SINR);
        select the first beam when:
            the first number of transmit/receive chains is greater than the second number of transmit/receive chains; and
            the second performance measurement does not exceed the first performance measurement by a threshold amount;
        otherwise, selecting the second beam; and
        transmit a beam report indicating the selected one of the first beam and the second beam.

8. The UE of claim 7, wherein selecting one of the first and second beams is based at least in part on a maximum permissible output power associated with each of the first and second antenna panels.

9. The UE of any of claim 7, wherein selecting one of the first and second beams is based at least in part on a rank associated with each of the first and second antenna panels.

10. The UE of any of claim 7, wherein selecting one of the first and second beams is based at least in part on a throughput associated with each of the first and second antenna panels.

11. The UE of claim 7, wherein selecting one of the first and second beams is based at least in part on at least one of a data buffer status, a priority of data and a latency constraint.

12. The UE of claim 7, wherein selecting one of the first and second beams is based at least in part on comparison of at least one of the first and second performance measurements to a threshold.

* * * * *